(12) United States Patent
Deleule

(10) Patent No.: US 12,500,048 B1
(45) Date of Patent: Dec. 16, 2025

(54) APPARATUSES, SYSTEMS, AND METHODS FOR NON-MECHANICAL BUTTONS

(71) Applicant: STMICROELECTRONICS INTERNATIONAL N.V., Geneva (CH)

(72) Inventor: Arnaud Deleule, San Jose, CA (US)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/745,315

(22) Filed: Jun. 17, 2024

(51) Int. Cl.
*H01H 9/02* (2006.01)
*G01S 7/4865* (2020.01)
*G01S 17/10* (2020.01)

(52) U.S. Cl.
CPC .............. *H01H 9/02* (2013.01); *G01S 7/4865* (2013.01); *G01S 17/10* (2013.01)

(58) Field of Classification Search
CPC .......... H01H 9/02; G01S 7/4865; G01S 17/10
USPC ....................................................... 307/112
See application file for complete search history.

(56) References Cited

U.S. PATENT DOCUMENTS

| | | | |
|---|---|---|---|
| 11,893,959 B2 | 2/2024 | Kim et al. | |
| 2011/0024627 A1* | 2/2011 | Yao | G01J 1/0271 |
| | | | 250/353 |
| 2020/0200522 A1* | 6/2020 | Huang | G01S 7/497 |
| 2020/0382694 A1 | 12/2020 | Dutton et al. | |
| 2021/0110130 A1* | 4/2021 | Kim | G06V 40/1347 |
| 2022/0276379 A1 | 9/2022 | Yokoyama | |
| 2023/0033775 A1* | 2/2023 | Akhbari | G06N 3/045 |

OTHER PUBLICATIONS

ST Life.augmented, "Time-Of-Flight Sensors With Greater Data Throughput," Oct. 23, 2023, STMicroelectronics.

* cited by examiner

*Primary Examiner* — Richard Tan
(74) *Attorney, Agent, or Firm* — Alston & Bird LLP

(57) ABSTRACT

Apparatuses, systems, and methods for non-mechanical buttons are provided. For example, a switch may be provided that includes a cavitied body of transparent material with a plurality of cavities sized to accept a target object and one or more time of flight sensors, including a first sensor positioned to detect the target object entering one of the cavities. The switch may generate an output signal associated with a switch state based on the target object detected.

20 Claims, 8 Drawing Sheets

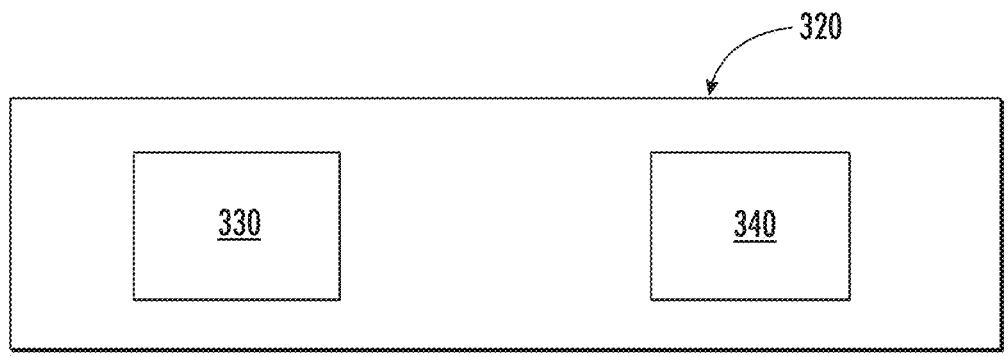
FIG. 3A
FIG. 3B
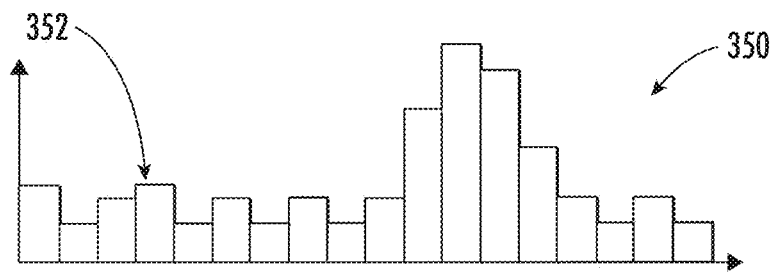
FIG. 3C

APPARATUSES, SYSTEMS, AND METHODS FOR NON-MECHANICAL BUTTONS

TECHNOLOGICAL FIELD

Example embodiments of the present disclosure relate generally to non-mechanical buttons, particularly to buttons or switches utilizing time of flight sensors and neural networks to generate control signals.

BACKGROUND

Specific industrial environments have constraints for spark emission or protection, such as in environments containing explosive vapors and/or chemicals. Thus various environments such as chemical environments, explosive environments, and/or hazardous spaces may not allow for conventional mechanical buttons and/or switches. Such conventional devices may utilize mechanical operations to actuate, and these mechanical operations may cause or generate sparks. A spark may, for example, cause or create an explosion or other hazard. Conventional methods for utilizing such mechanical buttons or switches have included using explosion proof boxes, but these may be bulky and problematic, or capacitive touch, which may be difficult to use when wearing protective equipment (e.g., gloves).

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to apparatuses, systems, and methods for non-mechanical buttons including time of flight sensors and neural networks.

In accordance with some embodiments of the present disclosure, an example switch is provided. The example switch includes a cavitied body comprising a transparent material with at least a first surface including one or more cavities, wherein each of the one or more cavities is sized to accept a target object, and wherein the transparent material is transparent at at least a first wavelength of light; one or more time of flight sensors configured to radiate light pulses at at least the first wavelength of light, including a first time of flight sensor positioned to detect at least the target object entering at least a first cavity of the one or more cavities based on one or more reflections; and the switch is configured to generate an output signal associated with a switch state based on the target object detected.

In some embodiments, the switch further includes at least one processor and at least one memory storing instructions that, when executed by the at least one processor, are configured to cause the switch to generate an output signal by: reading sensor data from the one or more time of flight sensors; generating detection data based on the sensor data; postprocessing the detection data to detect the target object; and generating the output signal associated with the switch state based on the target object detected.

In accordance with some embodiments of the present disclosure, an example method for operating a switch is provided. The method may include providing a cavitied body comprising a transparent material with at least a first surface including one or more cavities, wherein each of the one or more cavities is sized to accept a target object, and wherein the transparent material is transparent at at least a first wavelength of light; radiating, with one or more time of flight sensors, light pulses at at least the first wavelength of light, including with a first time of flight sensor positioned to detect at least the target object entering at least a first cavity of the one or more cavities based on one or more reflections; and generating an output signal associated with a switch state based on the target object detected.

In some embodiments, the target object is detected by: reading sensor data from the one or more time of flight sensors; generating detection data based on the sensor data; and postprocessing the detection data to detect the target object.

In accordance with some embodiments of the present disclosure, an example switch is provided. The example switch includes a cavitied body comprising a transparent material with at least a first surface including one or more cavities, wherein each of the one or more cavities is sized to accept a target object, and wherein the transparent material is transparent at at least a first wavelength of light; one or more time of flight sensors configured to radiate light pulses at at least the first wavelength of light, including a first time of flight sensor positioned to detect at least a first target object entering at least a first cavity of the one or more cavities based on one or more reflections; at least one processor and at least one memory storing instructions that, when executed by the at least one processor, are configured to cause the switch to: read sensor data from the one or more time of flight sensors; generate detection data based on the sensor data; postprocess the detection data to detect the target object; and generate an output signal associated with a switch state based on the target object detected.

In some embodiments, to generate detection data based on the sensor data the instructions, when executed by the at least one processor, are further configured to cause the switch to: identify cavity sensor data from the sensor data; generate an indication of target object based on the cavity sensor data and or one more thresholds; and generate detection data based on the indication of target object.

In some embodiments, to generate detection data based on the sensor data the instructions, when executed by the at least one processor, are further configured to cause the switch to: convert the sensor data to neural network input data; generate, with a neural network, neural network output data; and generate detection data based on the neural network output data.

In accordance with some embodiments of the present disclosure, an example method for operating a switch is provided. The example method includes: providing a cavitied body comprising a transparent material with at least a first surface including one or more cavities, wherein each of the one or more cavities is sized to accept a target object, and wherein the transparent material is transparent at at least a first wavelength of light; reading sensor data from one or more time of flight sensors configured to radiate light pulses at at least the first wavelength of light, including a first time of flight sensor positioned to detect at least a first target object entering at least a first cavity of the one or more cavities based on one or more reflections; generating detection data based on the sensor data; postprocessing the detection data to detect the target object; and generating an output signal associated with a switch state based on the target object detected.

In some embodiments, generating detection data based on the sensor data comprises: identifying cavity sensor data from the sensor data; generating an indication of target object based on the cavity sensor data and or one more thresholds; and generating detection data based on the indication of target object.

In some embodiments, generating detection data based on the sensor data comprises: converting the sensor data to neural network input data; generating, with a neural network, neural network output data; and generating detection data based on the neural network output data.

In some embodiments, the plurality of cavities are arranged in a line on the first surface.

In some embodiments, the plurality of cavities are arranged in a two dimensional pattern.

In some embodiments, there is a second time of flight sensor, and the first time of flight sensor is associated a first grouping of cavities of the plurality of cavities and the second time of flight sensor is associated a second grouping of cavities of the plurality of cavities.

In some embodiments, the plurality of output layer nodes are each associated with a target object being identified in a different cavity or with a target object being identified in none of the plurality of cavities.

In some embodiments, the at least one processor includes a first processor and a second processor, wherein the first processor is associated with causing the apparatus to generate neural network output data and the second processor is associated with causing the apparatus to postprocess the neural network output data.

In some embodiments, the apparatus is configured as a switch that, when the target object is detected, stays in a first state until the target object or another target objected is subsequently identified in a subsequent time period.

In some embodiments, the neural network input data is comprised of ranging data, ambient light level data, and signal rate data.

In some embodiments, the sensor data comprises a plurality of data, including histogram data, ranging data, ambient light level data, and signal rate data.

In some embodiments, the first wavelength of light is one of 805 nm, 905 nm, or 940 nm.

In some embodiments, the method includes generating the output signal includes generating the output signal associated with a first state until the target object or another target object is subsequently identified in a subsequent time period.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
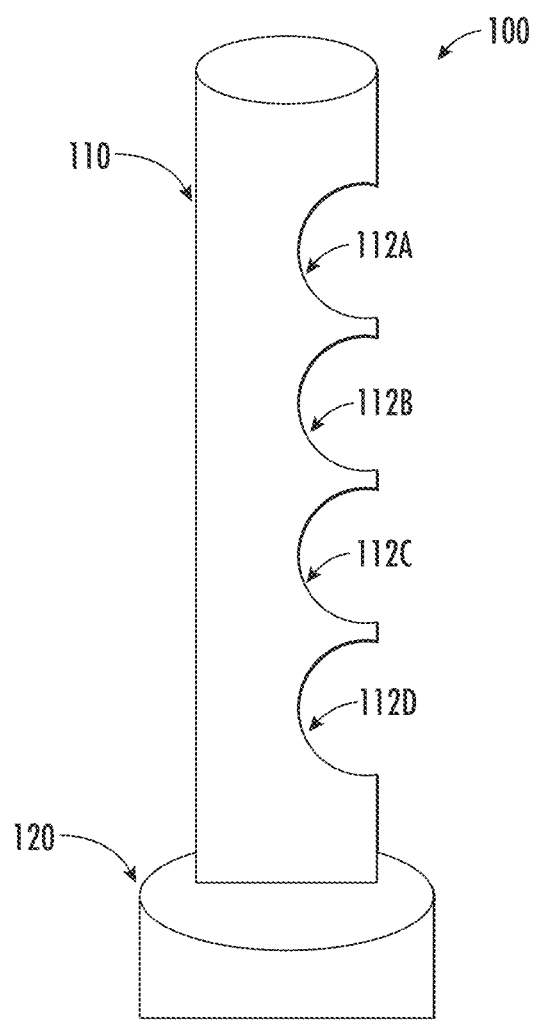
Figure 2A:
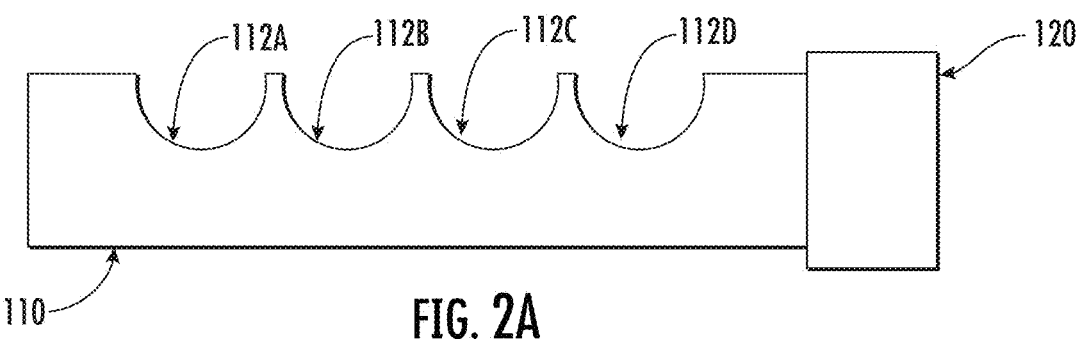
Figure 2B:
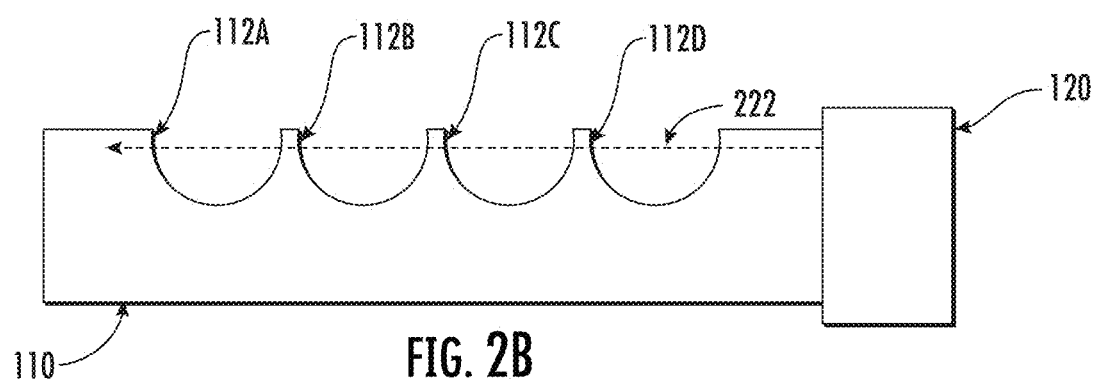
Figure 2C:
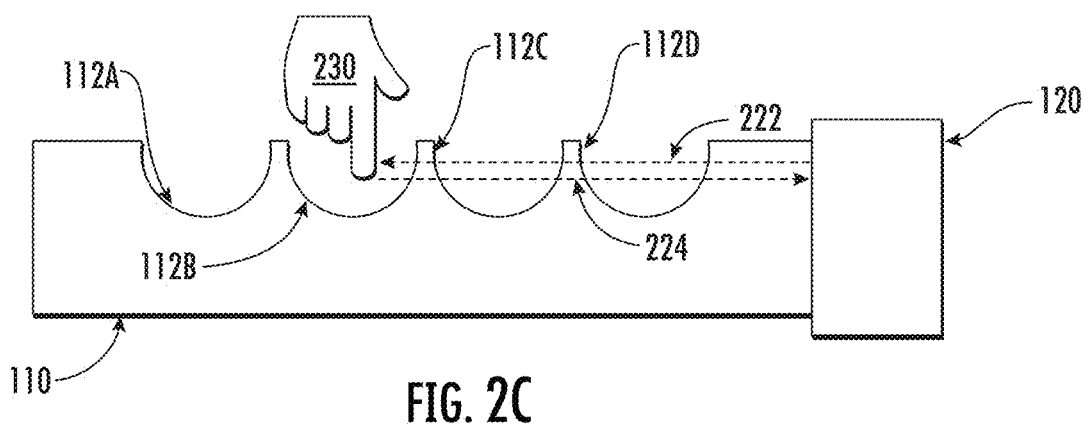
Figure 4A:
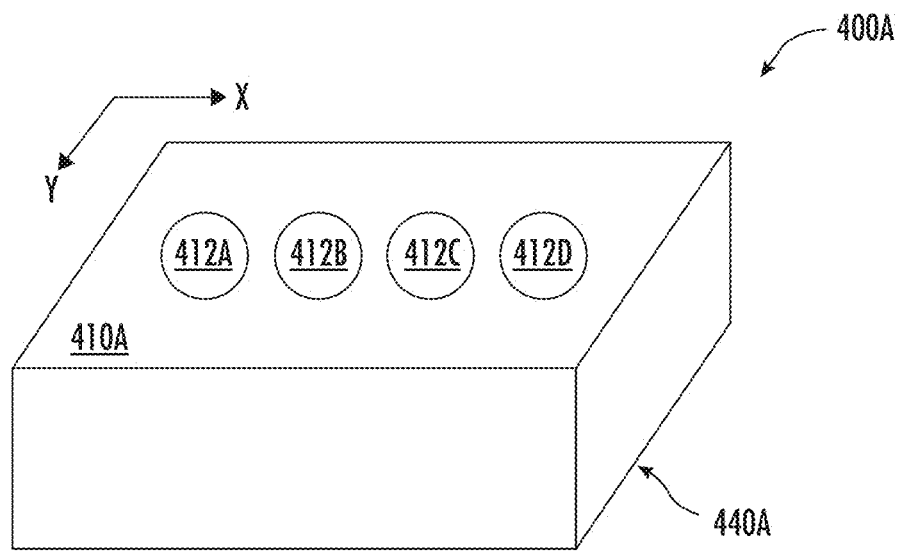
Figure 4B:
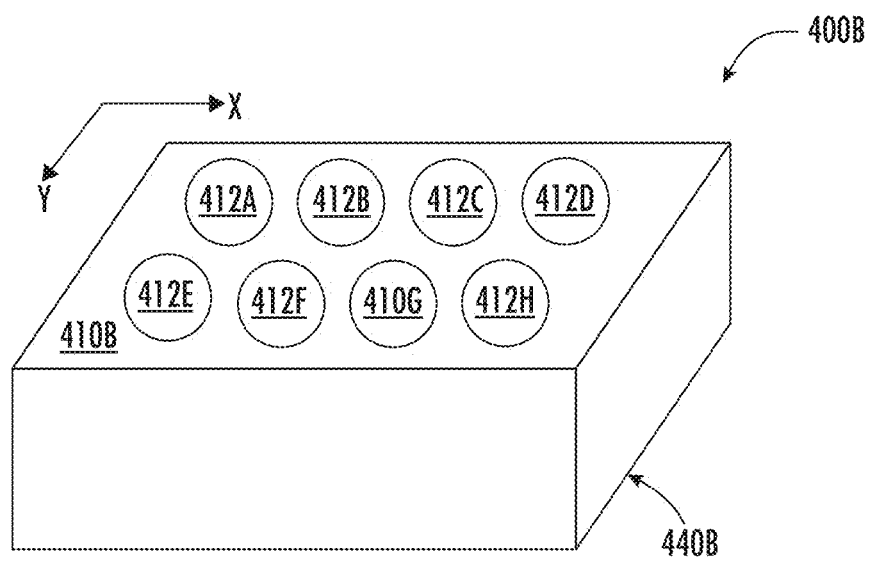
Figure 5A:
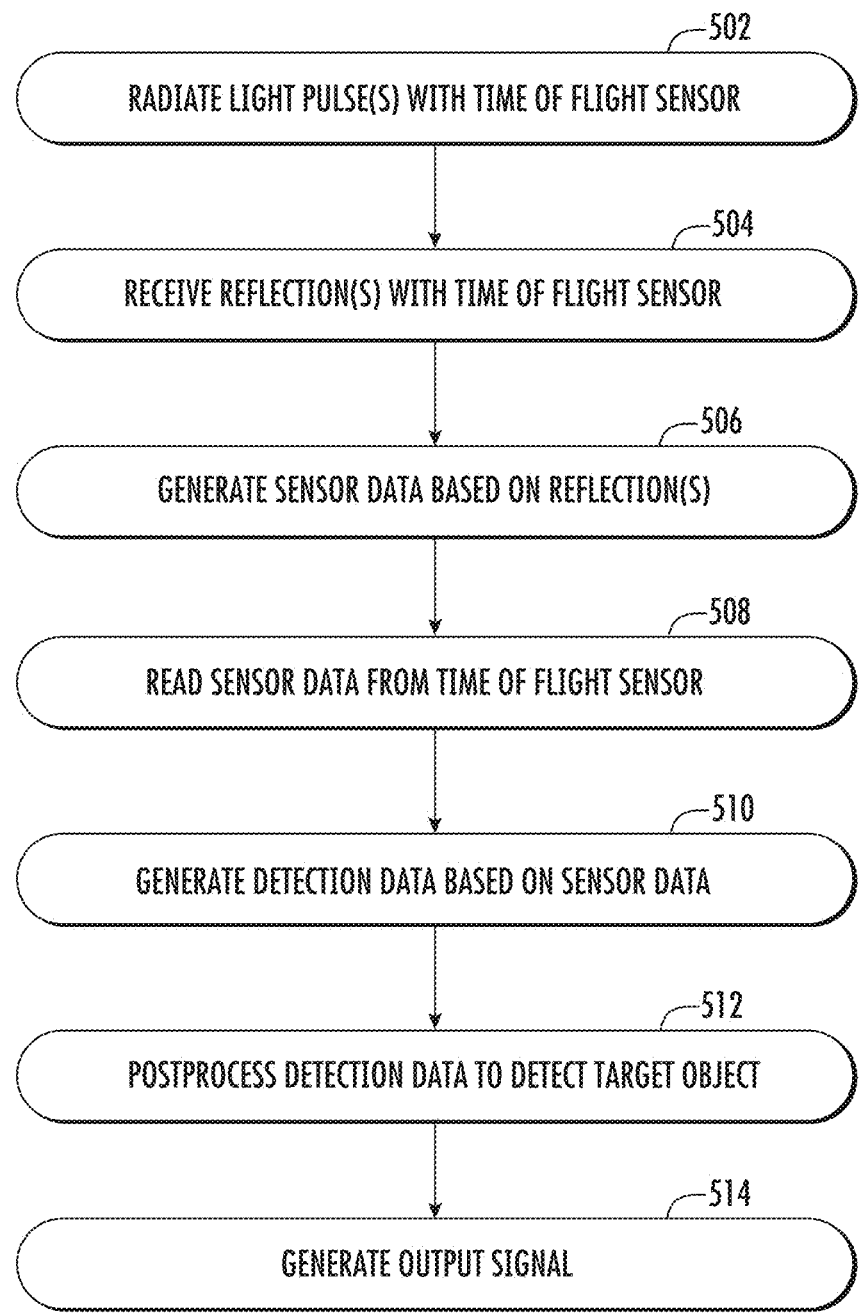
Figure 5B:
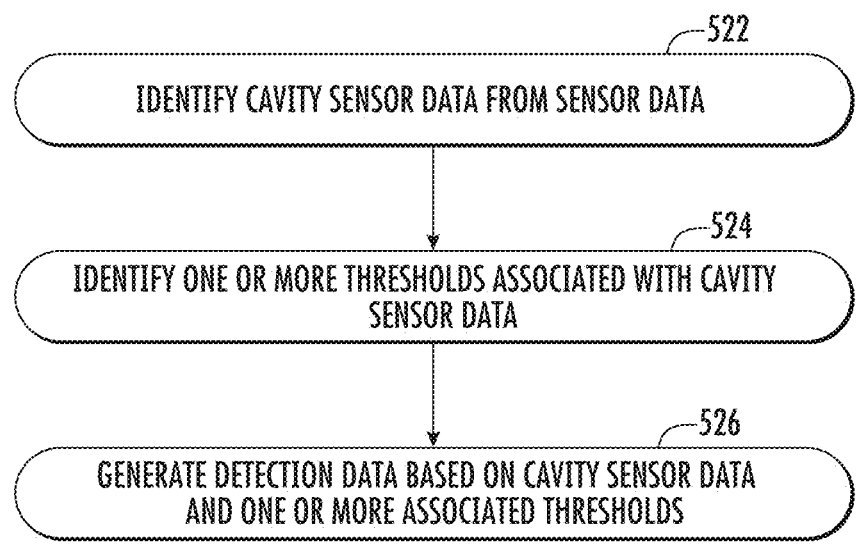
Figure 5C:
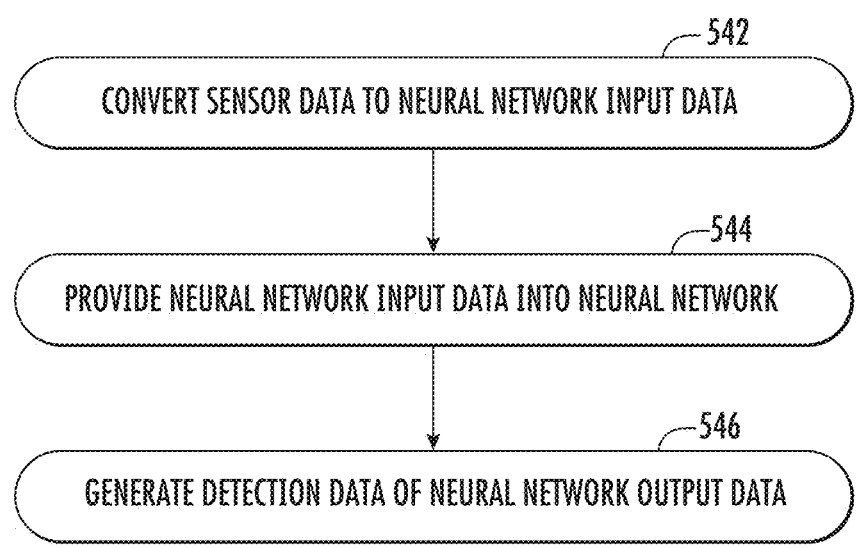
Figure 6:
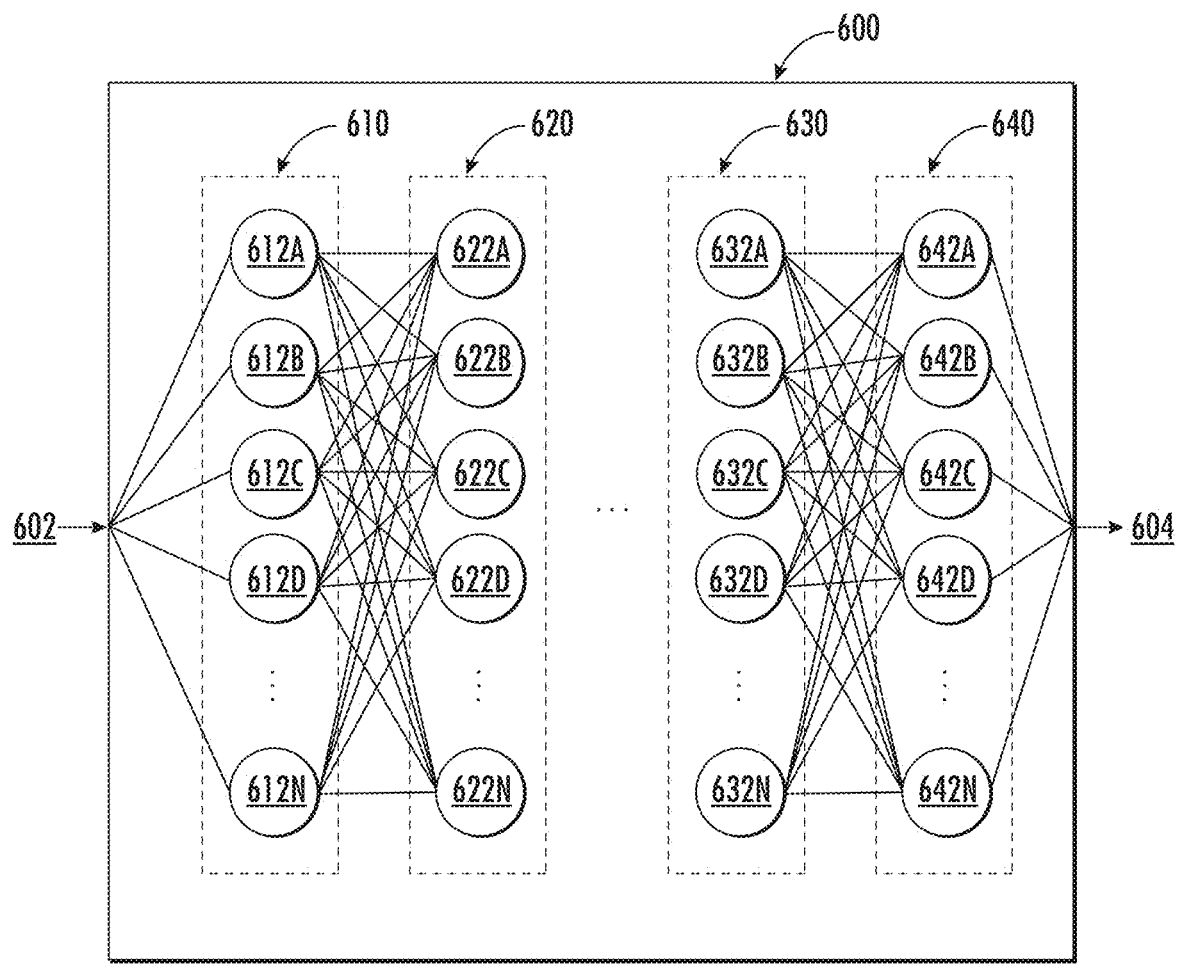
Figure 7:
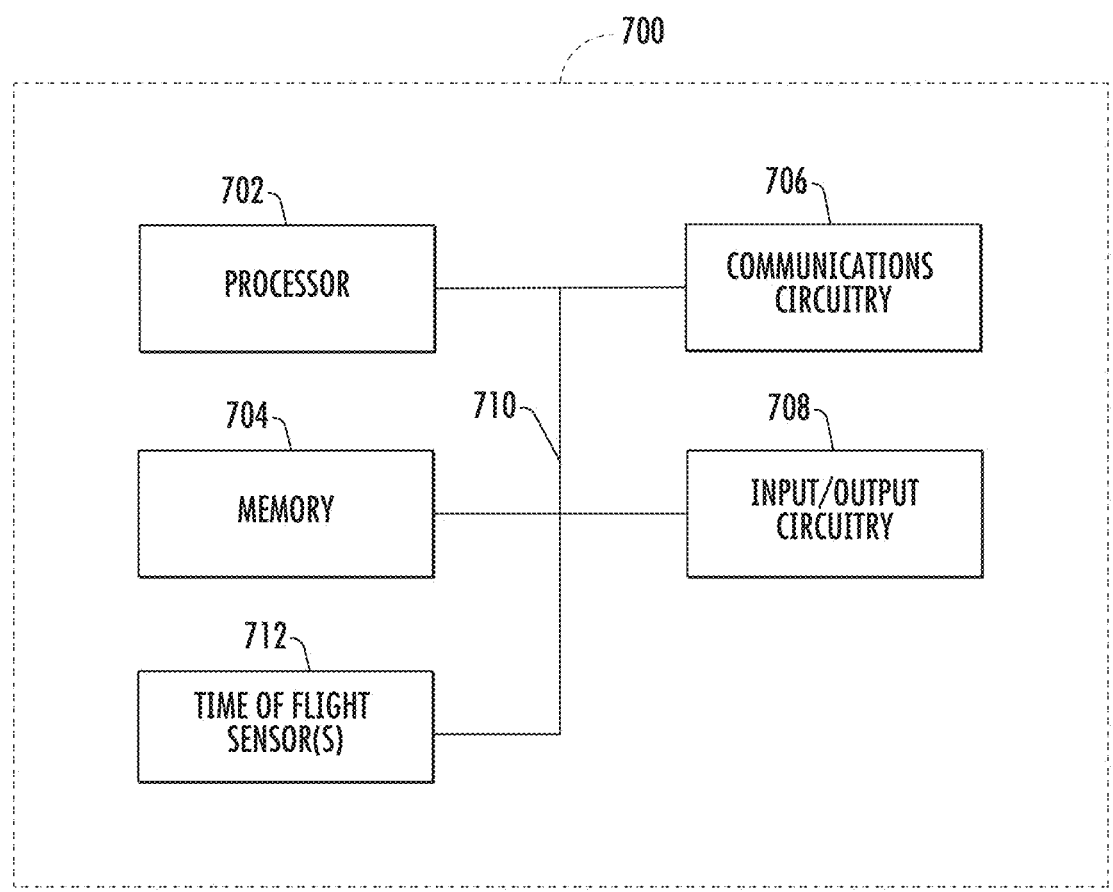

Having thus described certain example embodiments of the present disclosure in general terms, reference will now be made to the accompanying drawings, which are not necessarily drawn to scale, and wherein:

FIG. 1 illustrates exemplary buttons in accordance with one or more embodiments of the present disclosure;

FIGS. 2A-2C illustrate exemplary buttons being operated in accordance with one or more embodiments of the present disclosure;

FIGS. 3A-3C illustrate exemplary time of flight sensor, time of flight sensor data, and time of flight sensor zone mapping in accordance with one or more embodiments of the present disclosure;

FIGS. 4A-4B illustrate exemplary button arrangements in accordance with one or more embodiments of the present disclosure;

FIGS. 5A-5C illustrate flowcharts of exemplary operations associated with generating an output signal with one or more buttons in accordance with one or more embodiments of the present disclosure;

FIG. 6 illustrates an exemplary block diagram of a neural network in accordance with one or more embodiments of the present disclosure; and FIG. 7 illustrates an exemplary device in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Various embodiments of the present disclosure are directed to non-mechanical buttons. The non-mechanical buttons may be used as buttons, keys for a keypad, and/or switches. The non-mechanical buttons may include one or more time of flight sensors to determine when a button is actuated. For example, the non-mechanical buttons may be used in a switch, and the determination of when a button is actuated may result in a change of state for the switch. The non-mechanical buttons include a cavitied body with a plurality of cavities. One or more time of flight sensors are used to determine when a target object is inserted into a cavity, which is when a non-mechanical button is actuated. In this manner, each cavity acts as a separate button. A switch utilizing these non-mechanical buttons may be configured in a variety of manners, some of which are described in the embodiments described herein.

The apparatuses, systems, and methods of the present disclosure are directed to utilizing one or more time of flight sensors to generate sensor data associated with a target object entering a cavity, detecting the target object based on the sensor data, and generating an output signal based on the detection. In various embodiments, one or more thresholds may be used with the sensor data to detect a target object. Alternatively or additionally, various embodiments may provide some or all of the sensor data to a neural network trained to generate neural network output data of a classification of a target object present in one or more cavities. Various embodiments may include postprocessing to identify when a target object is present.

Buttons and/or switches in accordance with the present disclosure do not utilize mechanical buttons and, thus, are improved over conventional mechanical buttons. The improvements include, among other things, not generating sparks or being susceptible to the wear and tear that conventional mechanical switches inherently are subjected to. Additional and/or alternative improvements are described in the present disclosure.

The plurality of cavities are included in a cavitied body, and an object may be inserted into one or more cavities. The object may be referred to as a target object as one or more light pulses may be targeted at the cavities and the target object may reflect such light pulses. One or more time of flight sensors are arranged to generate pulses of light that travel to or are targeted at these cavities and then to receive reflections of light generated when a target object is present in one or more of the cavities. The time of flight sensors may generate a plurality of types of sensor data, such as histogram data, ranging data, signal data, ambient light data, and the like. In various embodiments, the sensor data may be read out of the time of flight sensor(s), such as at one or more time intervals. Alternatively or additionally, in various embodiments the sensor data may be pushed from the time of flight sensor(s), such as at one or more time intervals.

In various embodiments, the sensor data may be used for detection of a target object based on one or more types of sensor data associated with reflections of light from a target object in a cavity being above and/or below one or more thresholds. The thresholds may not be associated with all of the sensor data that is generated, so one or more types of the sensor data may be identified along with the associated thresholds. These types of sensor data may be referred to as cavity sensor data. One or more thresholds may be used for the cavity sensor data to generate an indication if a target object is present in a cavity. The indication of a target object being present may be used to generate detection data.

In various embodiments, the sensor data may be provided to a trained neural network. The trained neural network may or may not utilize or require all of the sensor data that is generated by the time of flight sensors. To improve efficiency, one or more data types of the sensor data may be filtered out before the remaining sensor data is provided as neural network input data to the neural network. The neural network may have been trained to classify if a target object is not present or is present in one of each of the cavities. The neural network may include an output layer with a node for each of these classifications. Thus various embodiments may include n+1 nodes where the first n nodes are each associated with one of the number of cavities and the n+1 node is associated with no target object present in any cavity. The output of each output layer node may be used to generate detection data.

In various embodiments, detection data may be provided for postprocessing, such as by using a sliding window operation. As described herein, postprocessing may be used to improve efficiency, reduce false positives, and determine when a target object is present is a cavity. An output signal may be generated based on the target object being detected. The output signal may be associated with a switch state, which may be used, for example, as a control signal to control a piece of equipment, such as a light, lock, motor, etc.

In various embodiments, the duration of a length of time a target object is present in a cavity may be determined. This may be used to, for example, control a piece of equipment, such as operating as dimmer switch that change the operation of a piece of equipment, such as a light, with the duration the target object is present.

Exemplary Apparatuses, Systems, and Methods

Embodiments of the present disclosure herein include systems and apparatuses for non-mechanical buttons that may be implemented in various embodiments. Various embodiments include a device, such as a switch, with one button or a plurality of buttons. Various embodiments may include the button serving as a switch that, when activated, may stay a states until subsequent switched off by, for example, withdrawing of a target object from a cavity or, alternatively, another insertion of a target object into the cavity. Various embodiments may include the button serving as a switch that, when activated, may stay in one or more states until subsequent switched off by another activation of the button.

FIG. 1 illustrates an exemplary buttons in accordance with one or more embodiments of the present disclosure. A device 100 includes a cavitied body 110 and a time of flight sensor 120, which may be referred to herein as sensor 120. The cavitied body 110 is illustrated as a cylinder or rod with four cavities 112A, 112B, 112C, and 112D. In various embodiments, the cavities may also be referred to as notches or the like. The cavities 112 may act as buttons and/or as switches as described herein. In various embodiments each of the cavities 112 is sized so that an object may be placed into the cavity 112, such as a user's finger, hand, tool, or the like. The sensor 120 generates sensor data associated with an object when the object is present in one of the cavities. The device 100 may generate an output signal associated with which cavity 112 the object is detected in. Thus device 100 may generate an output signal as a non-mechanical button, non-mechanical switch, or the like for detecting the presence of a target and generating an output signal.

In various embodiments, the cavitied body 110 may be, as illustrated in FIG. 1, a cylinder or rod. The cavitied body 110 may be a transparent material through which light generated by the sensor 120 may pass, including out and in of the cavities 112. An exemplary material for the cavitied body may be acrylic. When an object is present in a cavity 112, then light generated by the sensor 120 is reflected to the sensor 120 so that the reflected light may be received and detected by a photosensor of the sensor 120. In this manner the device 100 may detect which cavity 112 a user put in a target object, such as a finger, a gloved hand, a tool, and/or the like. For example, a switch with a plurality of cavities may have each cavity sized so that a portion or all of a user's gloved hand may be inserted into a cavity.

In various embodiments, the material of the cavitied body 110 may be transparent in a narrow range of wavelengths of light and not generally transparent. For example, the cavitied body 110 may be transparent at an infrared color of light used by the sensor 120 but not transparent at other wavelengths of light (e.g., not transparent in the visible light spectrum that appears transparent a user's eye). In this way, one or more light pulses generated and radiated by the sensor 120 may pass through the transparent cavitied body 110. In various embodiments, each cavity 112 or some of the cavities 112 may be associated with a different wavelength of light.

In various embodiments, the time of flight sensor 120 may be generate and radiate or emit light, such as a pulse of light that may be radiated as a cone or beam. The pulse of light may be radiated in a first direction towards and through at least one cavity 112 of the cavitied body 110. An example of a time of flight sensor may be a VL53L8CH Time of Flight sensor offered by STMicroelectronics.

It will be appreciated that the illustration of FIG. 1 illustrates the cavitied body 110 and sensor 120 in an arrangement where the cavitied body 110 is on top of the sensor 120. It will also be appreciated that the cavitied body 110 and the sensor 120 may be in other arrangements, some of which are described herein. For example, the cavitied body 110 may be arranged with a rectangular body having a plurality of sides, including a first side that includes the plurality of cavities 112. Alternatively or additionally, the cavitied body 110 may include a plurality of sides and the cavities 112 may be arranged on more than one side of the cavitied body 110, such as a first side and a second side. In various embodiments, a cavitied body 110 may have a shape with a first surface (e.g., a cylinder or rod) and the cavities 112 may be a first side of the cavitied body 110, such as illustrated in FIG. 1. Alternatively or additionally, such cavities 112 of a cavitied body 110 in the shape of a rod may be arranged on a first side (e.g., the right side of the rod shape illustrated in FIG. 1) and also arranged on a second side (e.g., the left side of the rod shape illustrated in FIG. 1). Various arrangements may allow for more cavities 112 to be located in smaller sized cavitied body 110.

In various embodiments, there may be a 2D array or arrangement of cavities along at least a first surface that may be associated with more than one sensor 120. In such embodiments a sensor 120 may radiate a pulse of light to at least one cavity 112 and may also radiate a pulse of light to multiple cavities 112.

The device 100 may be non-metal and non-mechanical. This may prevent the generation of sparks in an environment, such as an environment that may contain combustible vapors and/or materials. This may also improve durability by reducing wear and tear on mechanical buttons and/or switches.

The device 100 may include one or more other components, such as described herein. For example, the device 100 may include a time of flight sensor as well as a processor and memory. The processor and memory may be located with or remotely from the cavitied body 110 and sensor 120. For example, in various embodiments the processor and memory may be located remotely from the cavitied body 110 and sensor 120 to allow for locating the cavitied body 110 and sensor 120 in a particular location. Alternatively, the cavitied body 110 and sensor 120 may be located with the processor and memory, such as described herein, which may allow for a reduction in overall size of a system or apparatus.

FIGS. 2A-2C illustrate exemplary buttons being operated in accordance with one or more embodiments of the present disclosure. For example, the cavities 112 may be used as buttons that are operated by the presence of a target object 230 being inserted into a cavity 112.

FIG. 2A illustrates a device 100 in a horizontal orientation.

FIG. 2B illustrates the sensor 120 generating and emitting or radiating a pulse of light 222 from the sensor 120. The pulse of light travels through the cavitied body 110 and through the cavities 112. In FIG. 2B there is no target object present and the pulse of light 222, thus, is not associated with any reflections from striking a target object.

FIG. 2C illustrates the pulse of light 222 traveling a first distance associated with cavity 112B where the pulse of light 222 strikes a target object 230. The target object 230 may be a finger, hand, or object that is inserted into a cavity 112. When the pulse of light 222 strikes the target object 230 then a light reflection or reflection 224 is generated that reflects off the target object 230. The reflection 224 travels to the sensor 120, which detects the reflection 224 with one or more photosensors or the like (e.g., a single-photon avalanche diode (SPAD) array). The photosensors may receive, among other things, one or more photons from the reflection(s) 224.

In various embodiments, the photosensors may also receive ambient light. The sensor 120 may determine an ambient light level based on the ambient light received and measured. This ambient light level may be a threshold used to determine when a reflection is received as the reflection may be an amount of light (e.g., photons) that are greater than the threshold associated with the ambient light.

In various embodiments the sensor 120 may generate one or more sensor data based on the light sensed by the photosensor. In various embodiments, the sensor data may be read out by, for example, a processor that uses the sensor data for additional operations, such as described herein. Alternatively or additionally, in various embodiments, the sensor data may be transmitted by the sensor 120, such as to a processor for use for one or more operations described herein. For example, the sensor 120 may generate sensor data continuously or in response to reflections 224 from a target object 230 being above an ambient light threshold and transmit the sensor data.

The sensor data may be generated according to a slicing time. The slicing time may be a time period for sampling data from the photosensor. In various embodiments the slicing time is a short time period in which samples are generated based on the light received by the photosensor(s).

When one or more photons associated with a reflection are received by the photosensor(s), that is associated with a target being present. A reflection may have a peak when the target is present and then the photons may be lower as a target object 230 enters and/or leaves a cavity, which may be in previous and/or subsequent time periods.

FIGS. 3A-3C illustrate exemplary time of flight sensor, time of flight sensor data, and time of flight sensor zone mapping in accordance with one or more embodiments of the present disclosure.

FIG. 3A illustrates a time of flight sensor 320 in accordance with one or more embodiments of the present disclosure. The time of flight sensor 320 may include a laser 330 configured to generate, emit, or radiate pulses of light 222. In various embodiments, the laser 330 may be one or more VCSELs. The time of flight sensor 320 may include a photosensor 340 configured to receive light, such as reflections 224 and ambient light in an environment. In various embodiments, the photosensor 340 may be comprised of an array of photosensors. In various embodiments, the photosensor 340 may be SPAD array. The time of flight sensor 320 may have the laser 330 located on a first side along with the photosensors 340 such that both the laser 330 and the photosensors 340 share a field of view.

FIG. 3B illustrates exemplary time of flight sensor outputs in accordance with one or more embodiments of the present disclosure. The time of flight sensor 320 may generate histogram data 350. A histogram may, for example, be comprised of measurements of photons received by one or more SPADs of a SPAD array. The histogram data 350 may be associated with time period comprised of multiple slices of data taken in accordance with a slicing time. Histogram data 350 may include a plurality of bins 352 of measurements of photons for a time period.

The sensor data generated by the time of flight sensor 320 may include one or more histograms. The histograms may be included in a one or more histogram data 350 that store histograms associated with the photosensor 350.

The time of flight sensor 120 may utilize the histogram data 350 to generate one or more other types of data based on the histogram data 350 or may convert or extract the histogram data 350 to one or more other types of data, particularly utilizing the bin data in the histogram data 350 over one or more periods of time. In various embodiments, such other data may include ranging data, ambient light data, signal rate data, peak signal data, distance data (e.g., data associated with a median range), target object status data, zone ID data, returned pulse width data, first bin data, and last bin data. Such data along with the histogram data 350 may be referred to as sensor data.

In various embodiments, ranging data may be a set of data that may be generated from, extracted from, or converted from histogram data 350. Ranging data may be associated with a distance at which a target object 230 is associated, such as by receiving one or more reflections 224. In various embodiments, the ranging data may be associated with or include a distance measurement (e.g., centimeters, inches, or the like).

In various embodiments, ambient light data be a set of data that may be generated from, extracted from, or converted from histogram data 350. Ambient light data may be associated with a level of light that is received by a photosensor 350 and not associated with a light pulse. For example, the ambient light data may be associated with light or photons received by the photosensor 350 from an environment. In various embodiments, a light pulse may be in the infrared spectrum, such as at 805 nm, 905 nm, or 940 nanometers (nm). The ambient light level may be how much, for example, 805 nm, 905 nm, or 940 nm light there is in the environment. It will be appreciated that while specific examples of wavelengths of light are described, various embodiments of the present disclosure may use other wavelengths of light. While the photosensor 340 may measure light and/or reflections at a specific frequency or frequency band, ambient light data may measure or be associated with the amount of ambient light in the environment when a pulse 222 is not emitted. The ambient light data may be used to determine and/or calibrate the ambient light level, which may be used with identifying when a reflection is received. For example, the ambient light level may be a single value or may be continuously updated over time.

A reflection may be when light is received that exceeds the ambient light level. The ambient light may be measured when there is not a pulse. Then, when a pulse has been emitted, the reflections received during a period of time after the pulse is emitted is evaluated to determine if a target object is present. If the light received in this period of time is below or at the ambient level of light after a pulse has been emitted then it may be determined that there are no reflections from a target object 230. If the light received in this period of time is above the ambient light level, then it may be determined that there are reflections from a target object 230.

In various embodiments, signal rate data may be a set of data that may be generated from, extracted from, or converted from histogram data. Signal rate data may be associated with the strength of a signal or data of received light (e.g., of a reflection). For example, if light is emitted onto a target object that is black then the target object may absorb the photon(s) and the reflections will be lower. In contrast, if an object is white then may have a higher reflectivity and a higher number of photons reflected. The number of photons is associated with the strength of the reflections, which may be used for the signal rate data.

In various embodiments, one or more additional data sets may be determined from the histogram or received from the time of flight sensor, which may be input into operations described herein. For example, a reflectance of a target object may be determined associated with reflective (e.g., how black or how white) a target is, which may be related to the signal rate and the square of the distance from the target to the time of flight sensor.

The sensor data may be read out of the sensor 120. Alternatively and/or additionally, the sensor data may be transmitted from the sensor 120. For example, it may be read out by a processor (e.g., a separate microcontroller) as described herein.

FIG. 3C illustrates a zone mapping 360 for a photosensor 350 having a plurality of zones 362. Each zone 362 may be associated with a unique histogram and unique histogram data. Each zone 362 may be associated with one or more distinct photosensor elements of the photosensor 350 (e.g., a different SPAD of a SPAD array). It will be appreciated that while a 4×4 zone mapping is illustrated, various embodiments may include more or less zones, such as one zone, 8×8 zone mapping, or other zone mappings.

FIGS. 4A-4B illustrate exemplary button arrangements in accordance with one or more embodiments of the present disclosure.

FIG. 4A illustrates exemplary cavities arranged in a line or in a first dimension in accordance with one or more embodiments of the present disclosure. A device 400A may include a cavitied body 440A having a first surface 410A where a plurality of cavities 412A, 412B, 412C, 412D arranged in a line in one dimension along, as illustrated, an X axis.

FIG. 4B illustrates exemplary cavities arranged in an array or in two dimensions in accordance with one or more embodiments of the present disclosure. A device 400B may include a cavitied body 440B having a first surface 410B where a plurality of cavities 412 arranged in an array in two dimensions. For example, a first group of cavities of buttons 412A, 412B, 412C, 412D are arranged in a line in the X dimensions and then, in a different portion of the Y axis, a second group of buttons of cavities 412E, 412F, 412G, 412H are arranged in a second line.

In various embodiments, the cavities 412 may be located one or more surfaces of a cavitied body 440.

In various embodiments, one or more time of flight sensors 120 may be used with a device (e.g., 400). For example, in various embodiments with cavities arranged in two dimensions, a first time of flight sensor may be associated with the first group of cavities 412A, 412B, 412C, 412D and a second time of flight sensor may be associated with the second group of cavities 412E, 412F, 412G, 412H. Alternatively or additionally, a first time of flight sensor may be arranged or oriented to radiate pulses and receive reflections in a first direction (e.g., X axis) and a second time of flight sensor may be arranged or oriented to radiate pulses and receive reflections in a second directions (e.g., Y axis). In various embodiments with more than one time of flight sensor 120, the time of flight sensors 120 may be configured for utilizing the same frequencies of light and/or different frequencies of light as well as configured to radiate light at the same or different times and/or periods of times. Thus the time of flight sensors may be synchronized so that all or not all radiate light at the same time. Such configurations may reduce interference and/or noise.

FIGS. 5A-5C illustrate flowcharts of exemplary operations associated with generating an output signal with a one or more buttons in accordance with one or more embodiments of the present disclosure.

FIG. 5A illustrates a flowchart of exemplary operations associated with generating an output signal with a one or more buttons in accordance with one or more embodiments of the present disclosure.

At operation 502, radiate light pulse(s) with time of flight sensor. As described herein, the time of flight sensor may radiate or emit one or more light pulses that travel through a transparent cavitied body 110.

At operation 504, receive reflection(s) with time of flight sensor. As described herein, a target object may generate reflection(s) that are reflected back to the time of flight sensor. The time of flight sensor receives the reflection(s).

At operation 506, generate sensor data based on reflection(s). The time of flight sensor may generate sensor data, which may contain one or more types of sensor data described herein.

At operation 508, read sensor data from time of flight sensor. The data read from a sensor 120 may be the sensor data. The sensor data may include one or more time periods or slices of histogram data 350 and/or other data described herein.

At operation 510, generate detection data based on sensor data. The sensor data may be used to generate detection as described herein, including but not limitation to the operations described in association with FIGS. 5A and 5C.

At operation 512, postprocess detection data to detect target object. The detection data may be associated with the presence of a target object in a cavity or a target object not being present in a cavity. In various embodiments, detection data may include an indication that a target object is present in a cavity. Alternatively or additionally, the detection data may include an indication for each of a plurality of cavities if a target object is present. In various embodiments, the indication may be a probability. The probabilities may be further processed to determine if a target object is present. Such postprocessing increases detection reliability. Additionally or alternatively, postprocessing may increase detection reliability by removing false positives, but as by using a slide window operation.

In various embodiments, the detection data may include an indication of present or not present associated with each associated cavity over a time period (e.g., slicing time).

In various embodiments, the detection data may include neural network output data having different classifiers all with non-zero probabilities being output. With the classes and, thus, probabilities received, may perform postprocessing to identify a correct class (e.g., cavity) associated with a target object being present.

In various embodiments, postprocessing may include utilizing a sliding window operation. A sliding window operation may generate an output based on multiple inputs. As an example utilizing detection data from a neural network, the sliding window operation may, for each output layer node, group a plurality of neural network output over multiple time periods together (e.g., 3, 5, 7 time periods). Then the sliding window operation may determine if a probability of a target object is present is above a threshold for a majority or all of the sliding window or time periods. The sliding window may be continuous grouping of detection data of neural network output data so that as a new neural network output data is available for a particular output layer node is generated then the earliest output utilized in the respective sliding window is dropped while this newest output is utilized. Thus the sliding window operation(s) may look back at a recent plurality of neural network output data collectively to determine if a target object may be identified as being inserted into a cavity. Similarly, a sliding window may be used with detection data based on sensor data and one or more associated thresholds.

At operation 514, generate an output signal. The device (e.g., 100, 400) may, on determining or identifying a target object is present, generate an output signal. In various embodiments, a single output signal may be identified that identifies which cavity the target object was identified in. Alternatively or additionally, each cavity may be associated with a different unique output signal so that these output signals may be taken out at different pins or terminals and routed separately. In various embodiments, an output signal(s) may be associated with one or more switch states. For example, a device (e.g., 100, 400) may be a switch, such as a light switch. Each cavity may be associated with a different light. Detecting a target object as present in a first cavity may cause the generating of an output signal to turn on (or off) a first light. Similarly, a target object present in a second cavity may cause the generating of a second output signal to turn on (or off) a second light.

In various embodiments, the control signal may be a constant signal. For example, it may be a continuous on (or off) signal.

In various embodiments, the control signal may be a repeating signal. For example, instead of a continuous signal, a repeating value may be applied at each of successive time periods for which a target object is detected in a cavity.

In various embodiments, the output signal may be provided directly to equipment (e.g., light, motor, etc.) to control the motor. In various embodiments, the output signal may be provided to a relay, which may either control an equipment or provide current to an equipment. The relay may be provided in a device.

FIG. 5B illustrates a flowchart of exemplary operations associated with generating detection data utilizing one or more thresholds in accordance with one or more embodiments of the present disclosure.

At operation 522, identify cavity sensor data from sensor data. The sensor data may include a plurality of types of data. In various embodiments, the sensor data may include, among other types of data, histogram data, ranging data, ambient light level data, and signal rate data. In various embodiments, one or more of these types of data may be identified as being utilized for detecting if a target object is present. For example, various embodiments may utilize ranging data. In another example, various embodiments may utilize ranging data and signal rate data. The type(s) of data used may be referred to as the cavity sensor data. Identifying the cavity sensor data from the sensor data may include extracting the cavity sensor data so that a processor does not need to process the entirety of sensor data. This might also include filtering the sensor data for the cavity sensor data and/or generating a cavity sensor data object containing only the cavity sensor data while omitting a remainder of sensor data.

At operation 524, identify one or more thresholds associated with cavity sensor data. One or more thresholds may be utilized with the cavity sensor data. Various embodiments may utilize different thresholds depending on the type of sensor data identified for the cavity sensor data. For example, a first threshold(s) may be used for ranging data. As another example, a second threshold(s) may be used for ranging data.

At operation 526, generate detection data based on cavity sensor data and one or more associated thresholds. Generating detection data based on cavity sensor data and one or more associated thresholds may include determining if the cavity sensor data is above, below, or in between associated thresholds.

For example, in various embodiments utilizing cavity sensor data including ranging data associated with a cavitied body 110 with 2 cavities, there may be four thresholds. The four thresholds may establish two ranges. A first range having a first threshold and a second threshold may be associated with a first cavity, and a second range having a third threshold and a fourth threshold may be associated with a second cavity. Detection data may be generated based on the ranging data associated with a reflection falls into one of these ranges. For example, if the ranging data associated with a reflection is between the first threshold and the second threshold, then the detection data may indicate a target object being in the first cavity. If the ranging data associated with a reflection is between the third threshold and the fourth threshold, then the detection data may indicate a target object being in the second cavity.

In various embodiments, the detection data may include an identification of the cavity and/or if a target object is present for a cavity identified. For example, the detection data may include data for both the first cavity and the second cavity along with an indication of if the target is present in the first cavity and the second cavity. Alternatively or additionally, detection data may include an identification of a cavity for while a target object may be present or, if not target object is present, an indication that no target object is present. The detection data may also include an indication of a time period for which the detection data is associated, which might be used in postprocessing the detection data.

FIG. 5C illustrates a flowchart of exemplary operations associated with generating detection data utilizing a neural network in accordance with one or more embodiments of the present disclosure.

At operation 542, convert sensor data to neural network input data. The conversion of sensor data to neural network input data may include selecting one or more portions of the sensor data and preparing it for use with a neural network. In various embodiments, this may be based on which data the neural network has been trained on. It may include the number of inputs nodes in the neural network. It may include extracting, filtering, and preparing one or more portions of data in the sensor data for use in the neural network. In various embodiments, this may include adding or removing identifiers to increase efficiency in utilizing a neural network.

At operation 544, provide neural network input data to neural network. The neural network input data may be provided to the neural network to be utilized by the neural network in generating neural network output data, such as described herein.

At operation 546, generate detection data of neural network output data. The neural network may utilize the neural network input data to generate neural network output data. The neural network output data may be based on the neural network input data and a trained neural network. The trained neural network may include a plurality of layers that have been trained to identify a cavity in which a target object is present and generating one or more reflections. The neural network output data may be utilized for generating detection data. For example, the detection data may include an identification of reach of the cavities or no cavity along with a probability of a target object being in an associated cavity or not being a cavity.

In various embodiments, an output layer of the neural network may include a plurality of output layer nodes. The plurality of output layer nodes may be equal to the number of cavities plus one. Thus each output layer node may be associated with a specific cavity except for one of the output layer nodes that is associated with no cavity and, thus, associated with no target object present. In such embodiments, the neural network may be a classifier may have discrete outputs of probability of a target object being associated with a specific cavity or not being present. The number of output layer nodes, which may be referred to as classes, may be the number of cavities plus one. Each neural network output layer node may generate a value that may be associated with a target object being present in an associated cavity or with a target object not being present.

In various embodiments, a device (e.g., 100, 400) may be configured to determine how long a target object is present in a cavity. The length of the target object being present may be used to, for example, cause a continuous output signal. For example, such a continuous output signal may be utilized as a dimmer switch to cause a light to dim or brighten.

In various embodiments, a device (e.g., 100, 400) may be configured to determine the depth is a target object is inserted into a cavity. The depth of the target object being present may be used to, for example, cause a variable output signal associated with the depth. For example, such a variable output signal be utilized to cause how bright a light should turn on to, turned down to, or switched to.

In various embodiments, a device (e.g., 100, 400) may be configured to determine the size or how many target objects may be inserted into a cavity. For example, it may be configured to determine how many fingers are inserted into a cavity. Alternatively or additionally, it may be configured to detect the size of a hand or shape of a hand inserted into a cavity. The number or size of target object(s) inserted into the cavity may be associated with generating one or more output signals. The output signals may be used for different or distinct controls.

FIG. 6 illustrates an exemplary block diagram of a neural network in accordance with one or more embodiments of the present disclosure.

The neural network 600 may receive neural network input data 602 and, with the neural network 600, generate neural network output data 604. The neural network may include one or more layers 610, 620, 630, 640. These layers may include an input layer 610, a plurality of hidden layers 620, 630, and an output layer 640.

Each layer may include a plurality of nodes. For example, the input layer 610 may include a plurality of nodes 612A, 612B, 612C, 612D, . . . 612N. The hidden layer 620 may include a plurality of nodes 622A, 622B, 622C, 622D, . . . 622N. The hidden layer 630 may include a plurality of nodes 632A, 632B, 632C, 632D, . . . 632N. The output layer 640 may include a plurality of nodes 642A, 642B, 642C, 642D, . . . 642N. The number of nodes in each layer may be the same or different than other layers.

In the neural network 600, the nodes of each layer are connected to one or more nodes of adjacent layers. Each of these connections may be weighted or biased so that a value or activation of a node in an earlier layer may result in an activation or deactivation of one or more nodes in a subsequent layer. The neural network 600 may be trained to set these weights and/or biases. In various embodiments, the neural network may be trained so that one or more nodes and/or layers may be skipped and/or jumped.

Training of the neural network may be performed with a training data set. The training data set may be generated during a calibration routine in which inputs are generated or provided. The training may be supervised and/or unsupervised. The neural network 600 may be trained during such calibration until the output layer is trained to generate output data that identifies or generate sufficient probabilities of desired output.

In various embodiments, during one or more calibration operations of training the neural network the input data may include all or some of the sensor data generated by time of flight sensors. During training of the neural network one or more data of the training input data may be identified as being the most relevant. For example, training of a neural network 600 may identify histogram data, ranging data, ambient level data, and/or signal rate data as being more relevant to identifying which cavity a target object may be inserted into. Such an identification of data may then be used to select or remove which time of flight sensor data to pass to the neural network and the neural network may be trained on these sets of data. Limiting such input data increases efficiency. For example, it may reduce the size of the neural network by removing additional data that may otherwise need to be utilized in the neural network, which may increase the number of nodes in the neural network and/or may skew weights and/or biases.

The neural network may be trained with training sensor data, which may be historical sensor data gathered and/or stored in memory. The training sensor data may include sensor data associated with one or more target objects being inserted into each cavity of the plurality of cavities. The training data used may include, for example, variations in the size or angle of target objects inserted into different cavities. The training sensor data may also include a plurality of sensor data associated with no target object being present in a cavity. The output layer of the neural network may be trained as a classifier to determine a classification of a target object being inserted into each cavity or no target object being present. The plurality of available classifications may include, for example, a target object inserted in a first cavity, a second cavity, a third cavity, etc. as well as no target object inserted.

FIG. 7 illustrates an exemplary device in accordance with one or more embodiments of the present disclosure. The device 700 may be an apparatus and/or a system. For example, the device 700 may be a button, plurality of buttons, switch, control pad, or the like. The device 700 may also include one or more pieces of equipment to operate, such as a light, a motor, etc. The device 700 illustrated may be an apparatus and/or system that includes a processor 702, memory 704, communications circuitry 706, input/output circuitry 708, time of flight sensor 712, and all of which may be connected by a bus or buses 710. While such connections are illustrated as bus 710, it will be readily appreciated that there may be multiple other connections. In various embodiments, the device 700 may be a button, plurality of buttons, and/or a keypad. It will be appreciated that one or more components may be located with or remotely from one or more other components. For example, in various embodiments the time of flight sensor(s) 712 and an associated cavitied body may be located remotely from the processor 702 and memory 704. Alternatively, in various embodiments the time of flight sensor(s) 712 and an associated cavitied body may be located with the processor 702 and memory 704.

The processor 702, although illustrated as a single block, may be comprised of a plurality of components and/or processor circuitry. The processor 702 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; one or a plurality of microcontrollers; and various other processing elements. The processor may include integrated circuits. In various embodiments, the processor 702 may be configured to execute applications, instructions, and/or programs stored in the processor 702, memory 704, or otherwise accessible to the processor 702. When executed by the processor 702, these applications, instructions, and/or programs may enable the execution of one or a plurality of the operations and/or functions described herein. Regardless of whether it is configured by hardware, firmware/software methods, or a combination thereof, the processor 702 may comprise entities capable of executing operations and/or functions according to the embodiments of the present disclosure when correspondingly configured.

The memory 704 may comprise, for example, a volatile memory, a non-volatile memory, or a certain combination thereof. Although illustrated as a single block, the memory 704 may comprise a plurality of memory components. In various embodiments, the memory 704 may comprise, for example, a random access memory, a cache memory, a flash memory, a hard disk, a circuit configured to store information, or a combination thereof. The memory 704 may be configured to write or store data, information, application programs, instructions, etc. so that the processor 702 may execute various operations and/or functions according to the embodiments of the present disclosure. For example, in at least some embodiments, a memory 704 may be configured to buffer or cache data for processing by the processor 702. Additionally or alternatively, in at least some embodiments, the memory 704 may be configured to store program instructions for execution by the processor 702. The memory 704 may store information in the form of static and/or dynamic information. When the operations and/or functions are executed, the stored information may be stored and/or used by the processor 702.

In various embodiments, the memory 704 may store sensor data, neural network input data, and/or neural network output data so that such data may be used in one or more operations described here.

The communication circuitry 706 may be implemented as a circuit, hardware, computer program product, or a combination thereof, which is configured to receive and/or transmit data from/to another component or apparatus. The computer program product may comprise computer-readable program instructions stored on a computer-readable medium (e.g., memory 704) and executed by a processor 702. In various embodiments, the communication circuitry 706 (as with other components discussed herein) may be at least partially implemented as part of the processor 702 or otherwise controlled by the processor 702. The communication circuitry 706 may communicate with the processor 702, for example, through a bus 710. The communication circuitry 706 may be comprised of, for example, transmitters, receivers, transceivers, network interface cards and/or supporting hardware and/or firmware/software, and may be used for establishing communication with another component(s), apparatus(es), and/or system(s). The communication circuitry 706 may be configured to receive and/or transmit data that may be stored by, for example, the memory 704 by using one or more protocols that can be used for communication between components, apparatuses, and/or systems.

The input/output circuitry 708 may communicate with the processor 702 to receive instructions input by an operator and/or to provide audible, visual, mechanical, or other outputs to an operator. The input/output circuitry 708 may comprise supporting devices, such as a keyboard, a mouse, a user interface, a display, a touch screen display, lights (e.g., warning lights), indicators, speakers, and/or other input/output mechanisms. The input/output circuitry 708 may comprise one or more interfaces to which supporting devices may be connected. In various embodiments, aspects of the input/output circuitry 708 may be implemented on a device used by the operator to communicate with the processor 702. The input/output circuitry 708 may communicate with the memory 704, the communication circuitry 706, and/or any other component, for example, through a bus 710.

The time of flight sensor 712 may communicate with the processor 702 to perform one or more operations described herein. In various embodiments, the time of flight sensor 712 may include a processor, memory, communication circuitry, and input/output circuitry of its own that will communicate with the processor 702, memory 704, communication circuitry 706, and/or input/output circuitry 708. The time of flight sensor is located with the cavitied body 110, which is not illustrated in FIG. 7. In various embodiments the time of flight sensor(s) 712 and an associated cavitied body may be located remotely from the processor 702 and memory 704. Alternatively, in various embodiments the time of flight sensor(s) 712 and an associated cavitied body may be located with the processor 702 and memory 704.

In various embodiments, the time of flight sensor 712 may include a first processor and a second processor 702 may be included in a microcontroller. The time of flight sensor 712 may generate sensor data that is read by a device 700, including being used by a processor 702 to generate a control signal as described herein. The control signal may be output by the input/output circuitry 708.

In various embodiments, a device 700 may also include a housing in which the cavitied body may be included. For example, a housing may surround all but one or more surfaces of the cavitied body, which may be used to control, among other things, the amount of ambient light that enters the cavitied body.

In various embodiments, the device 700 may be a switch with a cavity 112. For example, the switch may be a safety switch for a saw. When a target object (e.g., a user's gloved hand) is determined to be in the cavity 112, the safety switch may generate a control signal allowing the saw to be operated and when the target object is removed the control signal may prevent the saw from operating. In such embodiments, the control signal may be associated with one of two switch states. The first switch state with no target object detect may be a control signal associated with preventing operation of the equipment of a saw. The second switch state may be a control signal permitting operation of the equipment of a saw. By inserting a target object into the cavity, a user may allow for a saw to be operated by causing the safety switch to change from a first state to a second state. On removal of the target object the safety switch may change states when the target object is no longer detected. In such embodiments, a switch may change states based on the detection, and subsequent no detection, or a presence of a target object.

In various embodiments, the device 700 may be a switch with two cavities. This switch may change states depending on the last button of a cavity a target object is inserted into. For example, a target object (e.g., a user's finger) may be inserted into a first cavity to generate a control signal to cause operation of a piece of equipment (e.g., a light). The switch may continue to provide the control signal until a target object is detected in a second cavity, which may, for example, turn off the light.

In various embodiments, the device 700 may be a switch with a plurality of cavities. For example, a switch may have three cavities. Each of the three cavities may be associated with a different switch state. In various embodiments using two speed motors, a first switch state may be associated with off, a second switch state may be associated with a first motor speed, and a second switch state may be associated with a second motor speed. This switch may change states depending on the last button of a cavity a target object is inserted into. For example, a target object (e.g., a user's finger) may be inserted into: a first cavity to generate a control signal associated with the off state; a second cavity to generate a control signal associated with a second switch state to cause the motor to operate at the first speed; or a third cavity to generate a control signal associated with a third switch state to cause the motor to operate at the first speed. Similar embodiments may provide multiple switch states associated with other equipment, such as lights to provide various levels of illumination.

In various embodiments, the device 700 may utilize a duration that a target object is inserted into a cavity to change switch states. For example, if a target object is inserted into a first cavity for a first duration of time, then the switch may be associated with a first switch state. If the target object is inserted into the cavity for a second duration of time, the switch may change to a second switch state, and so on. In this manner one or more cavities may be used to control for multiple switch states.

In various embodiments, the device 700 may be configured to adjust the control signal based on the distance a target object is inserted into a cavity. For example, various embodiments may increase an amplitude or value of a control signal based on the distance the target object is inserted into a first cavity. The first cavity may be associated with a light, and the greater amplitude may be associated with controlling the light to provide an increased amount of light (e.g., control a dimmer to raise the amount of light generated).

It should be readily appreciated that the embodiments of the systems and apparatuses, described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A switch comprising:
a cavitied body comprising a transparent material with at least a first surface including one or more cavities, wherein each of the one or more cavities is sized to accept a target object, and wherein the transparent material is transparent at at least a first wavelength of light;
one or more time of flight sensors configured to radiate light pulses at at least the first wavelength of light, including a first time of flight sensor positioned to detect at least the target object entering at least a first cavity of the one or more cavities based on one or more reflections; and
wherein the switch is configured to generate an output signal associated with a switch state based on the target object detected.

2. The switch of claim 1, wherein the one or more cavities includes a plurality of cavities arranged in a line on the first surface.

3. The switch of claim 1, wherein the one or more cavities includes a plurality of cavities arranged in a two dimensional pattern.

4. The switch of claim 3 further comprising a second time of flight sensor, and wherein the first time of flight sensor is associated a first grouping of cavities of the plurality of cavities and the second time of flight sensor is associated a second grouping of cavities of the plurality of cavities.

5. The switch of claim 1 further comprising at least one processor and at least one memory storing instructions that, when executed by the at least one processor, are configured to cause the switch to generate the output signal by:
reading sensor data from the one or more time of flight sensors;
generating detection data based on the sensor data;
postprocessing the detection data to detect the target object; and
generating the output signal associated with the switch state based on the target object detected.

6. The switch of claim 5, wherein the instructions, when executed by the at least one processor, are further configured to cause generating the detection data based on the sensor data by:
identifying cavity sensor data from the sensor data;
generating an indication of target object based on the cavity sensor data and/or one more thresholds; and generating the detection data based on the indication of target object.

7. The switch of claim 5, wherein the instructions, when executed by the at least one processor, are further configured to cause generating the detection data based on the sensor data by:
converting the sensor data to neural network input data;
generating, with a neural network, neural network output data; and
generating the detection data based on the neural network output data.

8. The switch of claim 7, wherein the at least one processor includes a first processor and a second processor, wherein the first processor is associated with generating the neural network output data and the second processor is associated with the postprocessing the detection data.

9. The switch of claim 7, wherein the neural network input data is comprised of ranging data, ambient light level data, and signal rate data.

10. The switch of claim 1, wherein the first wavelength of light is one of 805 nm, 905 nm, or 940 nm.

11. A method for operating a switch comprising:
providing a cavitied body comprising a transparent material with at least a first surface including one or more cavities, wherein each of the one or more cavities is sized to accept a target object, and wherein the transparent material is transparent at at least a first wavelength of light;
radiating, with one or more time of flight sensors, light pulses at at least the first wavelength of light, including with a first time of flight sensor positioned to detect at least the target object entering at least a first cavity of the one or more cavities based on one or more reflections; and
generating an output signal associated with a switch state based on the target object detected.

12. The method for operating the switch of claim 11, wherein the one or more cavities includes a plurality of cavities arranged in a line on the first surface.

13. The method for operating the switch of claim 11, wherein the one or more cavities includes a plurality of cavities arranged in a two dimensional pattern.

14. The method for operating the switch of claim 13, wherein the one or more time of flight sensors include a second time of flight sensor; and
wherein the first time of flight sensor is associated a first grouping of cavities of the plurality of cavities and the second time of flight sensor is associated a second grouping of cavities of the plurality of cavities.

15. The method for operating the switch of claim 11, wherein the target object is detected by:
reading sensor data from the one or more time of flight sensors;
generating detection data based on the sensor data; and
postprocessing the detection data to detect the target object.

16. The method for operating the switch of claim 15, wherein generating the detection data based on the sensor data comprises:
identifying cavity sensor data from the sensor data;
generating an indication of target object based on the cavity sensor data and/or one more thresholds; and
generating the detection data based on the indication of target object.

17. The method for operating the switch of claim 15 wherein generating the detection data based on the sensor data comprises:
converting the sensor data to neural network input data;
generating, with a neural network, neural network output data; and
generating the detection data based on the neural network output data.

18. The method for operating the switch of claim 17, wherein the switch comprises a first processor and a second processor, wherein the first processor is associated with generating the neural network output data and the second processor is associated with the postprocessing the detection data.

19. The method for operating the switch of claim 17, wherein the neural network input data is comprised of ranging data, ambient light level data, and signal rate data.

20. The method for operating the switch of claim 11, wherein the first wavelength of light is one of 805 nm, 905 nm, or 940 nm.

* * * * *